United States Patent [19]

Pollack et al.

[11] Patent Number: 4,699,191
[45] Date of Patent: Oct. 13, 1987

[54] HOSE COUPLING MECHANISM

[75] Inventors: Jack Pollack, Reseda; Richard F. Pabers, Canoga Park, both of Calif.

[73] Assignee: Amtel, Inc, Providence, R.I.

[21] Appl. No.: 747,411

[22] Filed: Jun. 21, 1985

[51] Int. Cl.⁴ .............................................. B65B 3/04
[52] U.S. Cl. ..................................... 141/279; 141/387
[58] Field of Search ............... 141/279, 387, 388, 389, 141/1-12

[56] References Cited

U.S. PATENT DOCUMENTS

| | | | |
|---|---|---|---|
| 1,697,020 | 1/1929 | Priebe et al. | 61/69 R |
| 3,252,528 | 5/1966 | Nicolson | 166/352 |
| 3,311,063 | 3/1967 | Grable | 166/359 |
| 3,641,602 | 2/1972 | Flory et al. | 9/8 P |
| 3,840,927 | 10/1974 | Reid, Jr. | 9/8 P |
| 3,851,492 | 12/1974 | Cannon et al. | 61/69 R |
| 4,026,119 | 5/1977 | Dotti | 61/95 |
| 4,067,202 | 1/1978 | Reed | 61/86 |
| 4,088,089 | 5/1978 | Flory | 114/230 |
| 4,262,620 | 4/1981 | Nooteboom | 114/230 |
| 4,317,474 | 3/1982 | Kentosh | 141/387 |
| 4,423,983 | 1/1984 | Dadiras et al. | 405/195 |
| 4,459,930 | 7/1984 | Flory | 141/387 |
| 4,501,525 | 2/1985 | Grundy et al. | 414/139 |

Primary Examiner—Houston S. Bell, Jr.
Attorney, Agent, or Firm—Freilich, Hornbaker, Rosen & Fernandez

[57] ABSTRACT

An improved hose structure is provided for passing fluid across a universal joint, that permits a transfer structure to pivot about two horizontal axes with respect to a vessel or the like at the sea surface. A hose or other flexible conduit has a lower end connected to a pipe on the transfer structure and an upper end connected to a pipe on the vessel which can move up and down and which is biased upwardly. When the transfer structure tilts, to raise or lower the lower end of the hose, the upper end can also rise or fall to minimize bending of the hose, so that a substantially straight hose can be used.

6 Claims, 5 Drawing Figures

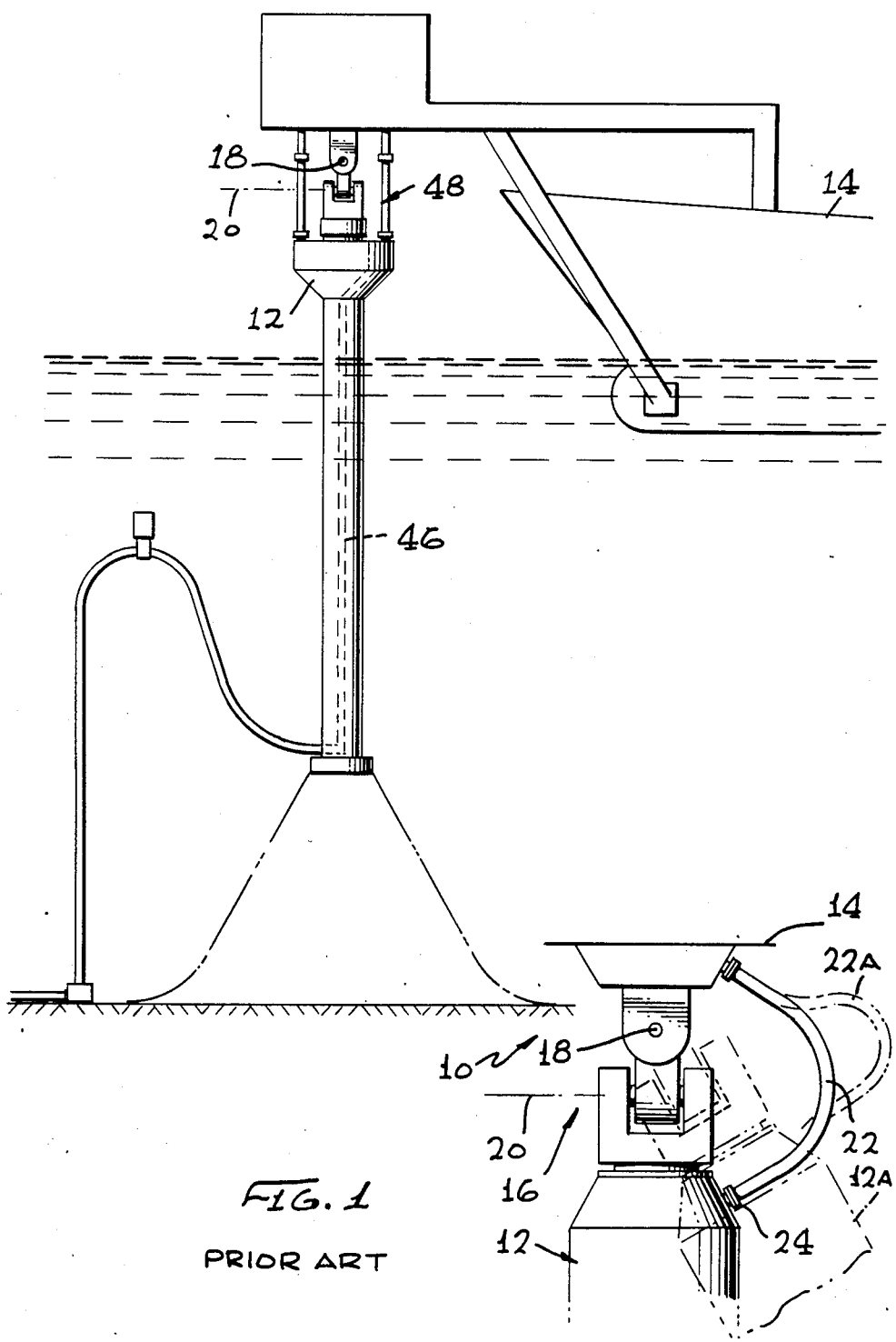

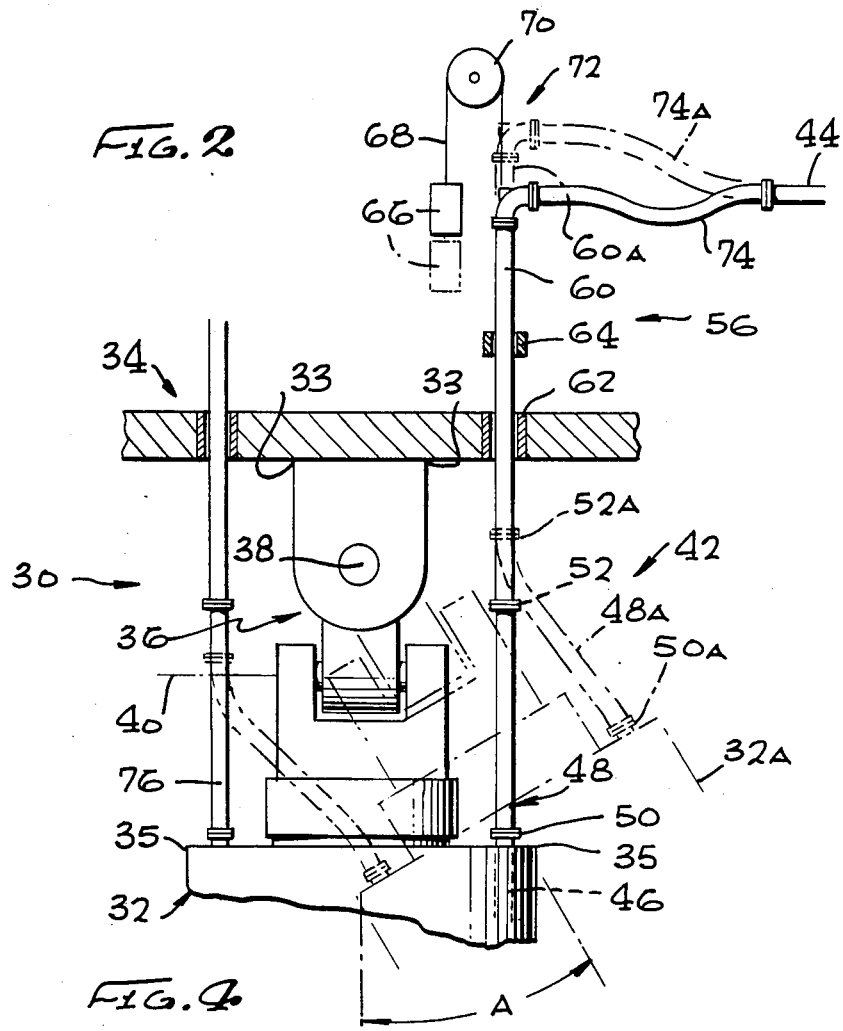
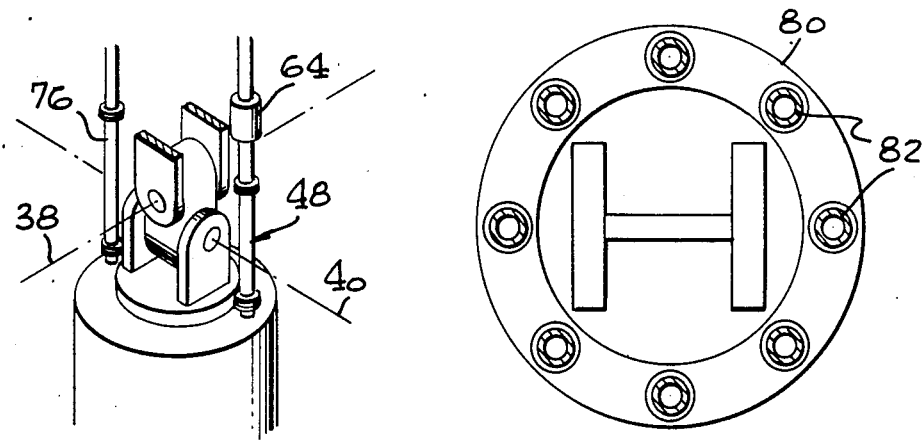

HOSE COUPLING MECHANISM

BACKGROUND OF THE INVENTION

An offshore terminal often includes a transfer structure such as a column whose lower end is anchored to the sea floor and whose upper end is coupled to a vessel or the like at the sea surface through a universal joint. The universal joint permits the transfer structure to pivot about horizontal axes with respect to the vessel. A pipe extending along the transfer structure has a lower end coupled to a pipe at the sea floor which may be connected to hydrocarbon wells or a shore installation. The upper end of the pipe on the transfer structure can be connected to a conduit on the vessel through a flexible conduit such as a hose or flexible pipe that carries fluid across the universal joint. As the transfer structure pivots with respect to the vessel, the ends of the flexible conduit are moved together and apart, and the flexible conduit must extend in a loose loop to accomodate such movement. Such flexible conduits extending in loops can be cumbersome, especially where many of such conduits are required, since the loops of conduits lie in a wide area and must be protected from damage. The flexible conduits can be subjected to a considerable range of bending that reduces their life, especially where they carry high pressures which result in considerable loading tending to bend them further. A fluid coupling structure which avoided wide looped hoses for passing across a universal joint, would be of considerable value.

SUMMARY OF THE INVENTION

In accordance with one embodiment of the present invention, a flexible conduit arrangement is provided for transferring fluid across the space occupied by a universal joint, which minimizes the curvature in the flexible conduit. At least one end of a flexible conduit which extends at least partially across a universal joint, can move up and down as a joint pivots. As a result, the flexible conduit bends only to the extent necessary to account for its lateral displacement as the universal joint pivots, rather than requiring flexing to account for vertical movement, the amount of lateral movement being relatively small for up to moderate joint pivoting.

The novel features of the invention are set forth with particularity in the appended claims. The invention will be best understood from the following description when read in conjunction with the accompanying drawings.

BRIEF DESCRIPTION OF THE DRAWINGS

FIG. 1 is a front elevation view of a portion of an offshore terminal of the prior art.

FIG. 2 is a partially sectional view of a portion of an offshore terminal constructed in accordance with the present invention.

FIG. 3 is a side elevation view of the offshore terminal of which the apparatus of FIG. 2 is a part.

FIG. 4 is a partial perspective view of the apparatus of FIG. 2.

FIG. 5 is a plan view of a portion of an offshore terminal constructed of accordance with another embodiment of the invention.

DESCRIPTION OF THE PREFERRED EMBODIMENTS

FIG. 1 illustrates a portion of an offshore terminal 10 of the prior art, which connects a transfer structure 12 to a vessel 14 or other structure that floats at the sea surface. A universal joint 16 supports the transfer strucuture 12 on the vessel, and permits the transfer strucutre to pivot about two largely horizontal axes 18, 20 with respect to the vessel. A hose 22 carries fluid between the transfer structure and vessel. The hose extends in a loop, in order to accomodate both vertical and horizontal movement of its lower end 24. For example, when the transfer structure pivots to the position 12A, the hose flexes into the floppy loop 22A. When the transfer structure pivots in the opposite direction, the hose tends to straighten. When the fluid passing through the hose is under high pressure and is moving rapidly, there are considerable loads on the hose, especially in its highly curved configuration at 22A. Such displacements create stresses that tend to reduce the lifetime of the hose. In addition, the considerable loop results in a wide area around the universal joint that must be protected.

FIG. 2 illustrates a portion of a system 30 of the present invention, which is here used to couple a transfer structure 32 to a vessel 34, to support the transfer structure on the vessel and to pass fluid between them. The system includes a universal joint 36 that permits the transfer structure to pivot about two largely horizontal axes 38, 40. The system also includes a means or mechanism 42 for transferring fluid between the upper member at 34 such as the vessel and the lower member 32 such as the transfer structure, by providing a coduit that couples a pipe 44 at the upper member 34 to another pipe 46 at the lower member or transfer structure 32.

The transfer mechanism 42 includes a flexible middle conduit 48 such as a hose or flexible pipe, which has a lower end 50 coupled to the lower conduit or pipe 46, and an upper end 52 coupled to the upper conduit or pipe 44. A coupling means or mechanism 56 serves to couple the upper end of the flexible conduit 48 to the upper pipe 44. The coupling mechanism 56 permits the upper end 52 of the flexible conduit to move up and down. Thus, when the transfer structure pivots from the quiescent position 32 wherein it hangs substantially straight down from the vessel (and/or opposite sides 33 and 35 of the upper and lower members are equally spaced), to an extreme pivoted position 32A wherein it has pivoted by an angle A of 30° from the vertical, the upper end of the flexible conduit can move upwardly to the position 52A. Such upward movement is almost as great as the upward movement of the bottom end of the flexible conduit to the position 50A, so that bending of the conduit at 48A need only be sufficient to account for the lateral or horizontal movement of the lower end of the conduit. Even at a 30° bend, the flexible conduit is only moderately flexed. As a result, the area around the universal joint that must be protected, is limited, and the small flexing of the conduit results in only small additional sideward stress on it due to high pressure fluid moving at high speed through the conduit.

The coupling mechanism 56 includes an elongated substantially vertical pipe or coupling conduit 60 which can move vertically and which is guided in such vertical movement by a pair of guides 62, 64. The pipe or coupling conduit 60 is biased in an upward direction by a mechanism 72 such as a counterweight 66 coupled through a line 68 that extends over a sheave 70 to the pipe 60. Other biasing devices such as a spring or hydraulic actuator can be used. Another flexible conduit 74 extends in a largely horizontal direction, to couple the top of the vertically moveable pipe 60 to the nonmoveable pipe 44 on the vessel. When the transfer structure moves the the position 32A, the vertical pipe moves to the position 60A and the auxilliary flexible conduit moves to the position 74A. The upward biasing mechanism 72 supplies sufficient upward force to support the weight of the pipe and auxilliary flexible conduit 60, 74, and apply additional upward force or biasing to the top of the primary flexible conduit 48 to maintain it in slight tension. This assures that when the transfer structure pivots, the top of the flexible hose will move up.

The system of FIG. 2 is shown as including in two flexible conduits 48, 76. Each conduit has a corresponding coupling mechanism which enables it to move up and down. In certain offshore terminals, many conduits are necessary for carrying fluids between a pipe at the sea floor and a vessel at the sea surface. FIG. 5 illustrates the top of a transfer structure 80 which includes eight pipes 82. By using a mechanism similar to that of FIG. 2, a relatively neat arrangement of eight largely vertical flexible conduits can be used to pass through the critical area at the level of the universal joint.

Thus, the invention provides a fluid coupling for carrying a fluid between members lying below and above a universal joint, which uses a flexible conduit such as a hose or flexible pipe that achieves only a moderate curvature and that is exposed to only moderate loading of fluid passing therethrough. This is achieved by use of a flexible conduit with opposite ends coupled to upper and lower pipes, and with at least one end being able to move largely vertically as the members pivot. The coupling mechanism, which couples the upper end of the flexible conduit to a pipe at the upper member, can include a largely vertical pipe which is biased upwardly, and whose upper end is coupled through an auxilliary flexible conduit to a substantially fixed pipe on the upper member.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a system which includes a universal coupling for connecting a lower member to an upper member and permitting them to pivot about a pair of largely horizontal and perpendicular axes, the improvement of means for transferring fluid between a lower member conduit at said lower member to an upper member conduit at said upper member comprising:
   a flexible middle conduit having upper and lower end portions and extending in a largely vertical direction and spaced from at least one of said horizontal axes, said upper end portion lying closest to said upper member and said lower end portion lying closest to said lower member;
   means for coupling said upper and lower end portions of said middle conduit respectively to said upper and lower member conduits;
   means for supporting one of said end portions of said middle conduit in movement in primarily vertical directions with respect to the member it is closest to, whereby to minimize bending of the middle conduit.

2. The improvement described in claim 1 wherein:
   said end portion of said middle conduit which is moveable, is said upper end portion; and
   said coupling means includes a pipe that is moveable in a largely vertical direction with respect to said upper member and which has a lower end connected to the upper end portion of said middle conduit, and said means for supporting includes means for biasing said pipe in a largely upward vertical direction with sufficient force to apply an upward bias to the upper end portion of said middle conduit.

3. The improvement described in claim 1 wherein:
   said members have a quiescent position wherein opposite sides of said members are substantially equally spaced, and said flexible middle conduit extends in substantially a straight line when said members are in their quiescent position.

4. An offshore terminal apparatus for use in the sea, comprising:
   a pipe lying at the sea floor;
   a fluid storage structure lying at the sea surface, having an upper pipe and a coupling device coupled to said upper pipe, and having a universal joint with a joint top and with a joint bottom that can pivot about two largely horizontal axes with respect to said joint top, said universal joint having a quiescent position wherein the joint bottom hangs from the top;
   a transfer structure anchored to the sea floor, and extending to said universal joint, said transfer structure having an upper end connected to said joint bottom;
   a transfer structure conduit extending from said pipe at the sea floor and to said transfer structure upper end;
   a flexible conduit which can bend, said flexible conduit having a lower end connected to the upper end of said transfer structure and in communication with said transfer structure conduit and having an upper end connected to said coupling device, said flexible conduit extending substantially straight when the universal joint is in its quiescent position;
   said coupling device having a coupling conduit with an end which is connected to the upper end of said flexible conduit, and having means for biasing said coupling conduit and the upper end of said flexible conduit upwardly, said upper end of said flexible conduit and said end of said coupling conduit being moveable vertically.

5. The apparatus described in claim 4 wherein:
   said coupling conduit of said coupling device comprises an elongated vertically extending pipe, and said coupling device includes at least one guide which guides said vertically-extending pipe in vertical movement.

6. The apparatus described in claim 4 wherein:
   said coupling conduit of said coupling device has a second end which is an upper end, and said coupling device includes a pipe with an end primarily horizontally spaced from said upper end of said coupling conduit, and also includes an auxilliary flexible conduit which extends between said upper end of said coupling conduit and said end of said pipe.

* * * * *